US009189457B2

(12) United States Patent
Le Goff et al.

(10) Patent No.: US 9,189,457 B2
(45) Date of Patent: Nov. 17, 2015

(54) METHOD FOR DISTRIBUTING COMPUTING LOAD IN A DATA PROCESSING SYSTEM

(75) Inventors: Mickael Le Goff, Berlin (DE); Dennis Noppeney, Köln (DE)

(73) Assignee: NATIVE INSTRUMENTS GMBH, Berlin (DE)

(*) Notice: Subject to any disclaimer, the term of this patent is extended or adjusted under 35 U.S.C. 154(b) by 8 days.

(21) Appl. No.: 12/893,118

(22) Filed: Sep. 29, 2010

(65) Prior Publication Data

US 2011/0078701 A1 Mar. 31, 2011

(30) Foreign Application Priority Data

Sep. 29, 2009 (DE) .......................... 10 2009 045 094
Feb. 18, 2010 (DE) .......................... 10 2010 002 111

(51) Int. Cl.
| | |
|---|---|
| G06F 9/455 | (2006.01) |
| G06F 9/46 | (2006.01) |
| G06F 17/15 | (2006.01) |
| G06F 9/50 | (2006.01) |
| G06F 17/10 | (2006.01) |

(52) U.S. Cl.
CPC ............ *G06F 17/156* (2013.01); *G06F 9/5083* (2013.01); *G06F 17/10* (2013.01)

(58) Field of Classification Search
None
See application file for complete search history.

(56) References Cited

U.S. PATENT DOCUMENTS

| | | | | |
|---|---|---|---|---|
| 6,788,648 | B1* | 9/2004 | Peterson ....................... | 370/252 |
| 7,536,693 | B1* | 5/2009 | Manczak et al. .............. | 718/105 |
| 2001/0037351 | A1* | 11/2001 | Hellberg ....................... | 708/313 |
| 2003/0046637 | A1* | 3/2003 | Zhang .......................... | 714/784 |
| 2003/0172044 | A1* | 9/2003 | ShamRao ...................... | 707/1 |
| 2005/0125798 | A1* | 6/2005 | Peterson ...................... | 718/105 |
| 2006/0224652 | A1* | 10/2006 | Rounioja et al. .............. | 708/404 |
| 2009/0254913 | A1* | 10/2009 | Kawano et al. ............... | 718/103 |
| 2010/0004766 | A1* | 1/2010 | Feng et al. ..................... | 700/94 |

FOREIGN PATENT DOCUMENTS

WO WO2007/115329 10/2007

OTHER PUBLICATIONS

Gardner W G: "Effect Convolution without Input-output Delay", Journal of the Audio Engineering Society, vol. 43, No. 3 (Mar. 1995), pp. 127-135.
Guilermo Garcia: "Optimal Filter Partition for Efficient Convolution with Short Input/Outpu Delay", 113th AES Convention, Oct. 5, 2002 (Jan. 5, 2002), Los Angeles, CA, USA, pp. 1-9.
Search Report dated Sep. 25, 2013 for related European Patent Application EP 10180597.

* cited by examiner

*Primary Examiner* — Abdullah Al Kawsar
*Assistant Examiner* — Bradley Teets
(74) *Attorney, Agent, or Firm* — Enshan Hong; Kent H. Cheng; VLP Law Group LLP

(57) ABSTRACT

A method and an arrangement for distributing processor load in a data processing system while executing of block-based computing instructions, as well as a corresponding computer program and a corresponding computer-readable storage medium, which can be used to uniformly distribute the processor load in processors for periodically occurring computing operations. The block-based computing instructions are divided into blocks. Each block requires a number of time-sequential incoming input values. The number can be predetermined for each block. A particular area of application is the field of digital processing of multimedia signals, such as audio signals, video signals, and the like. For distributing the processor load in a data processing system during execution of block-based computing instructions, the operations of the computing instruction to be performed in a block are divided into at least two computing steps, and the computing steps within a block are sequentially processed.

9 Claims, 4 Drawing Sheets

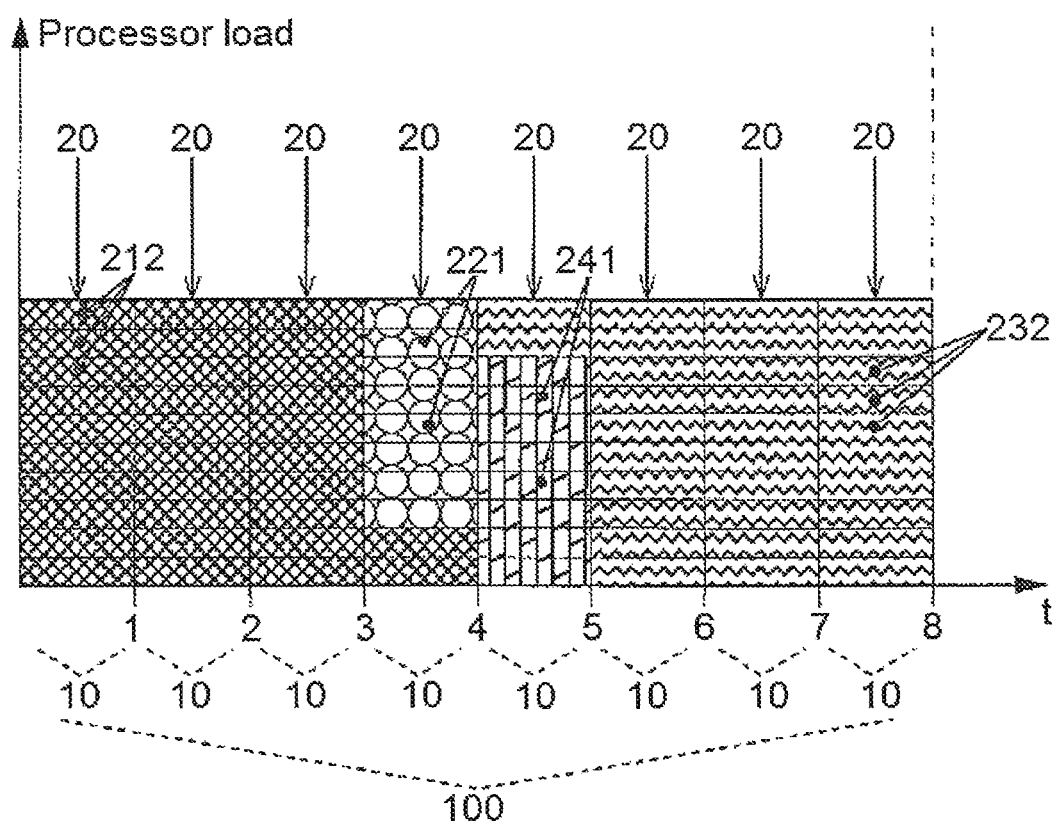

METHOD FOR DISTRIBUTING COMPUTING LOAD IN A DATA PROCESSING SYSTEM

RELATED APPLICATIONS

This application claims priority from German Application No. DE 10 2009 045 094.7 which was filed on Sep. 29, 2009 and German Application No. DE 10 2010 002 111.3 filed on Feb. 18, 2010.

BACKGROUND OF THE INVENTION

1. Field of the Invention

The invention relates to a method and arrangement for distributing the computing load in data processing systems during execution of block-based computing instructions, as well as a corresponding computer program and a corresponding computer-readable storage medium, which can be used to uniformly distribute the computing load in processors for periodically occurring computing operations. A particular application is related to the field of digital processing of multimedia signals, in particular audio signals, video signals and the like.

2. Description of the Related Art

The described method can be used, inter alia, for computing the time-discrete convolution, which due to its versatility has gained considerable importance in the field of digital processing of audio signals. The time-discrete convolution can be used to implement any type of linear and time-independent system of arbitrary complexity by mathematically linking the impulse response of the system to the audio signal. The time-discrete convolution is particularly important in the simulation of reverberations of rooms, because reverberations are difficult and complicated to model to their complexity and because the impulse response of a room can be obtained relatively easily. Impulse responses of rooms may sometimes be quite long, which causes the time-discrete convolution to be a very computing-intensive operation.

A computing instruction, which can be applied to the input signal in the time domain, is directly obtained from the definition of the convolution operation. The complexity for computing the time-discrete convolution scales linearly with the length of the impulse response. Depending on the power of the employed processor, the time-discrete convolution for long impulse responses can therefore frequently no longer be computed in real time.

A more efficient approach for computing the convolution is the so-called fast convolution, which is based on the equivalence of convolution in the time domain and multiplication in the frequency domain. Accordingly, impulse response and audio signal are transformed into the frequency domain, where they are multiplied, and the result is back-transformed into the time domain. The computing complexity can be significantly reduced by using the fast Fourier transformation (FFT), because the computing complexity no longer scales linearly with the impulse response, but instead only logarithmically. Because the entire audio signal must be available for the fast convolution, before the transformation can be started, the fast convolution in the aforedescribed form is not suitable for real-time computations.

Other methods are disclosed in the publication Kulp, Barry D.: "Digital Equalization Using Fourier Transform Techniques", $85^{th}$ AES Convention, Paper Number 2694; 1988, wherein impulse response and audio signal can be divided into several blocks for performing a fast convolution segment-by segment. The convolution with a segment of the impulse response will be referred to hereinafter as "segment convolution". The time-discrete convolution can be efficiently computed in real time by suitable selection of the segmentation pattern.

Disadvantageous with this method is the distribution of the computing load. As shown in FIG. 1, "input and output phases" (brick-pattern hatching) alternate in this method with "computing phases" (wavy hatching). During the input and output phases, sampled values from the input signal stream are sampled for the subsequent computing phase and the output signal stream is filled with the result from the preceding computing phase. The next computing phase always commences when N sampled values have been collected, making an additional FFT with the block size 2*N possible. (With the method overlap-add and overlap-save, the FFT length must be twice the size of the individual time segments.)

A load distribution of this type is very unfavorable for real-time processing, because the processing power of the executing system must be dimensioned such that the system is not overloaded during the computing phases. As a result, the processing power must be significantly higher than would otherwise be required with a uniform capacity utilization of the system.

A method for improved load distribution is disclosed in the publication Gardner, William G.: "Efficient Convolution without Input-Output Delay", JAES Volume 43, Issue 3, pp. 127-136; March 1995, which computes the different segment convolutions asynchronous with respect to the processing of the input and output signal stream. The input and output phases are hereby separated from the computing phases. However, because the input and output phases need the results from the computing phases, a synchronization must be performed at certain times in spite of asynchronous computation so as to ensure that the sampled values to be outputted are completely computed at the time they are outputted. Such synchronization can sometimes be time-consuming and is frequently not compatible with the boundary conditions which govern execution of the method. For example, if the method is executed on a computer with a multithreading operating system, then the real-time thread must never have to wait for another thread, because the real-time capability of the system could then no longer be guaranteed. In particular, the distribution of the computing capacity would then be subordinate to the operating system and cannot be influenced by implementing the method. In addition, according to this method, only the computing phases of different segment convolutions are temporally interleaved with one another. In particular, this method does optimally utilize the available computing capacity for arrangements with a limited number of segment convolutions.

Another method for improved load distribution in block based algorithm is described in the publication US 2003/0046637 A1. This system, which is a decoder, takes as its input a sequence of blocks of data. A certain predefined integer number of these blocks form a code word that needs to be decoded following a number of decoding steps. For each step, a specific algorithm is used and the steps have to be processed in chronological order. According to US 2003/0046637 A1 each algorithm is broken down into the same number of sub-steps as there are blocks in a code word. In this case, every time the system receives one new code block, it will process one sub-step of one of the several decoding steps, for one of the already received code words. This results in a constant computing load over time, where an entire block is the smallest unit, which is considered. A load distribution within a block is not considered. However, because only one sub-step is processed every time a code block is coming, the overall latency of the system is equal to X times a code word length, where X is the number of decoding steps. In a real time system, latency is often a crucial parameter and needs to be minimized, as a result this invention can be unsuitable.

SUMMARY OF THE INVENTION

It is therefore an object of the invention to provide a method and an arrangement for distributing the computing load in data processing systems during execution of block-based computing instructions, as well as a corresponding computer program and a corresponding computer-readable storage medium, which obviates the aforedescribed disadvantages and more particularly enables support of real-time processing of audio and/or video data.

The object is solved with the invention by the features recited in the independent claims. Advantageous embodiments of the invention are recited in the dependent claims.

According to one particular advantage of the method of the invention, a uniform utilization of the available processor resources during execution of block-based computing instructions is realized. This is achieved by dividing the computing instruction into several (at least two) computing steps which are sequentially processed, preferably in different time windows. With block-based computing instructions, a temporally sequentially incoming data stream, for example incoming input values (e.g., sampled values), are combined into blocks having each N input values. Depending on the computing instruction, a block includes additional data required for executing the computing instruction, for example results from computations in one or several preceding blocks. The computing instruction is applied to the N input values of such block. The computing instruction, which processes the input values of a block, includes one or several operations to be executed when the computing instruction is processed. The computing instruction may be, for example, a fast convolution, whereas the operations may be, for example, partial computing steps of a Fourier transformation, partial computing steps of an inverse Fourier transformation, block multiplications, butterfly operations, complex multiplications and/or basic computing operations, such as addition, multiplication, change of the mathematical sign and the like. According to the invention, the operations are combined into computing steps. A computing step includes therefore such operations (e.g., partial computing steps), which are executed in the same time window. The combination is preferably performed such that each computing steps of the computing instruction generates substantially the same computing load and hence takes up the same processor resources. Advantageously, to attain uniform utilization of the computing capacity, the computing steps are uniformly distributed over the duration of the arrival of the N input values of the next block. In a particularly advantageous embodiment, the computing steps are distributed uniformly, without interruption, over the duration of the arrival of the N input values of the next block. In another advantageous embodiment of the invention, the computing capacity is utilized substantially uniformly over the entire duration of at least one block. In another advantageous embodiment, a number of N computing steps may be processed commensurate with the timing cycle of the incoming input values. According to an alternative embodiment, the computing steps may be realized with a smaller spacing, i.e., the computing instruction may be structured into more than N computing steps. Alternatively, the number of computing steps may be smaller than N. According to the invention, the computing steps may be executed so that each computing step takes up a smallest possible time window, while requiring a high processor power; or the computing steps may be executed so as to utilize a wide time window, thus requiring low processor power. With the first-mentioned embodiment, none or only a few computing operations of other processes, which may optionally be executed in addition to the block-based computing instructions, may be realized in the (narrow) time window in which the computing step is performed, while the entire processor power is available for such computing operations outside the (narrow) time window. In the second embodiment, computing operations of other processes may be performed at any time; however, the entire processor power is not available during the (wide) time window where these computing steps are executed.

In a preferred embodiment of the invention, a substantially identical computing load is generated when processing of the block-based computing instruction. Preferably, the first computing step of the subsequent block follows seamlessly the last computing step of the preceding block. A substantially uniform utilization of the computing capacity during the execution of a block or of the computing instruction has the advantage that the free computing capacities can be readily estimated. This estimation is particularly useful when the capacity of a computing unit for implementing the method should be dimensioned, or when the computing unit should perform other computations in addition to the computing instruction performed with the aforedescribed method. Interfering load peaks, which occur with conventional solutions and which hinder the execution of such additional computations, are avoided with the invention.

According to another preferred embodiment of the invention, computing states, which the data processing system can assume when processing of the block-based computing instruction, may be stored. The computing steps are processed depending on the states. A computing step is associated with each state. Because the computing steps may each include different partial computing steps, the respective current state indicates which computing step must be executed. For example, the first state indicates the start of a block, wherein the (first) computing step associated with a first date is executed accordingly. After the first computing step has been executed, the state memory is updated and transitions to the second state, wherein the (second) computing step associated with a second state is then executed. All computing steps of a block are then sequentially processed depending on the respective current states. After the last computing step of a block has been processed, the state memory changes in a preferred embodiment again in the first state, and the first computing step of the following block is processed. Processing of the computing steps is therefore cyclic.

Advantageously, the states are updated commensurate with the timing of the incoming input values. In this case, a new computing step which is characterized by the respective current state value is executed with each incoming input value. This ensures synchronization of the computation with the input and output at all times, thereby ensuring in particular at the time the data are outputted that the computation of the data has been concluded.

According to a preferred embodiment, the computing instruction includes a time-discrete convolution. The operations which are executed while processing a block-based computing instruction may include, for example, computing steps of a Fourier transformation, computing steps of an inverse Fourier transformation, block multiplications, butterfly operations, complex multiplications, basic computing operations and/or other mathematical operations.

An arrangement according to the invention includes at least one chip and/or processor, wherein the arrangement is configured to execute a method for distributing the computing load in data processing systems while executing block-based computing instructions, wherein a block requires a number of time-sequentially incoming input values, wherein the number can be predetermined for each block, wherein the operations of the computing instructions to be performed in one block are divided into at least two computing steps, and the computing steps within a block are sequentially processed.

A computer program according to the invention enables a data processing system, after the computer program has been loaded into memory of the data processing system, to execute a method for distributing the computing load in data processing systems while executing block-based computing instructions, wherein a block requires a number of time-sequentially incoming input values, wherein the number can be predetermined for each block, wherein the operations of the computing instructions to be performed in one block are divided into at least two computing steps, and the computing steps within a block are sequentially processed.

In another preferred embodiment of the invention, the computer program according to the invention has a modular configuration, wherein individual modules are installed on different data processing systems.

Advantageous embodiments contemplate additional computer programs with which additional process steps and process flows described in the specification can be executed.

Such computer programs may be made available, for example, for downloading in a data or communications network (for a fee or free of charge, unrestricted or password-protected). The provided computer programs can be used by a method, wherein a computer program according to claim 8 is downloaded from an electronic data network, for example from the Internet, to a data processing system connected to the data network.

To carry out the method of the invention, a computer readable storage medium may be used on which a program is stored, which enables a data processing system, after the program as be loaded into the memory of the data processing system, to execute a method for distributing the computing load in data processing systems while executing block-based computing instructions, wherein a block requires a number of time-sequentially incoming input values, wherein the number can be predetermined for each block, wherein the operations of the computing instructions to be performed in one block are divided into at least two computing steps, and the computing steps within a block are sequentially processed.

The object of the invention is therefore a method which achieves an optimal and uniform utilization of the available computing capacity by removing the separation between input and output phases and computing phases. The computing instruction employed in the computing phases is hereby divided into smaller computing steps. The term computing instruction is to be understood, for example, as an algorithm for computing the fast convolution which includes a sequence of partial computing steps. According to the invention, individual partial computing steps of the algorithm are combined into respective partial computing steps. Ideally, the computing instruction is divided into N computing steps, so that with a block size of N sampled values, a computing step can be performed for the current block each time a sampled value to be collected for the next block arrives. This delay the output signals by additional N sampled values, i.e., by an additional block length. To optimally utilize the available computing capacity, the computing steps must be defined such that all computing steps produce an approximately identical computing load. This may be best achieved by breaking down the overall computing instruction into its basic computing operations. The small partial computing steps generated in this manner can then be later combined into N approximately uniform computing steps.

Because different computing steps need to be executed at different times, and since the individual computing steps may possibly include different partial computing steps, the arrangement which computes the convolution must have an internal state which is stored in a state memory and used for controlling the computation. A state is characterized by the partial computing steps which are to be performed in the corresponding computing step associated with the state. In a preferred embodiment, depending on this state memory, the computing step which is determined by the current state is additionally performed with each processed sampled value. The state memory is subsequently updated, so that the subsequent processing step is also performed when the subsequent sampled value is processed.

The invention provides a new method for doing FFT based calculus in real time by preserving a constant CPU load even within the time for executing the computing instructions within a block. The method is preferably usable for convolution or in phase vocoder systems.

According to the invention the constant CPU load over time even within a block can be realized. If a latency of N samples is allowed to the system, the method works as follows:
  receiving a first block of N samples,
  splitting the number X of operations of the computing instruction into X/N computing steps (sub-steps),
  performing N/X computing steps while receiving a sample value of the next block,
  returning the result of the operations of the computing instruction when receiving the N-th sample of the next block.

While solutions in the state of the art only provide a constant CPU load averaged over blocks as the smallest unit, the invention enables a constant CPU load also within each block, thereby preventing peaks within a block. According to the state of the art within a block the CPU load may be distributed enormously unbalanced (see FIG. 1 or 2).

BRIEF DESCRIPTION OF THE DRAWINGS

The invention will now be described in more detail with reference to an exemplary embodiment which is at least partially illustrated in the Figures. It is shown in.

DETAILED DESCRIPTION OF THE PRESENTLY PREFERRED EMBODIMENTS

The invention will now be described with reference to an exemplary computing instruction for the fast convolution used for processing audio signals. However, the invention is not limited to the computation of the fast convolution. Alternatively, the method of the invention may be applied to other block-based computing instructions. An optimization can be attained, for example, also for an FFT alone, outside a fast convolution, wherein the method of the invention is applied to the FFT. Alternatively, the method can also be applied to computing methods that do not employ an FFT. In addition, multi-dimensional transformations can also be optimized with the method of the invention (e.g., for video processing in real time).

FIGS. 2, 3, 5, 6 and 7 schematically illustrate the decomposition of the fast convolution into smaller computing steps for the block length N=8 and the FFT length sixteen. The twofold FFT length is required for the overlap-add and the overlap-save method, respectively, which is used to decompose the input signal stream into smaller blocks. The Figures also show the manner by which the timing of the sampled values subdivides the time 100, during which a block is inputted and outputted, into N time windows 10 which are coupled to the input and output of the respective sampled value.

Figure 1:
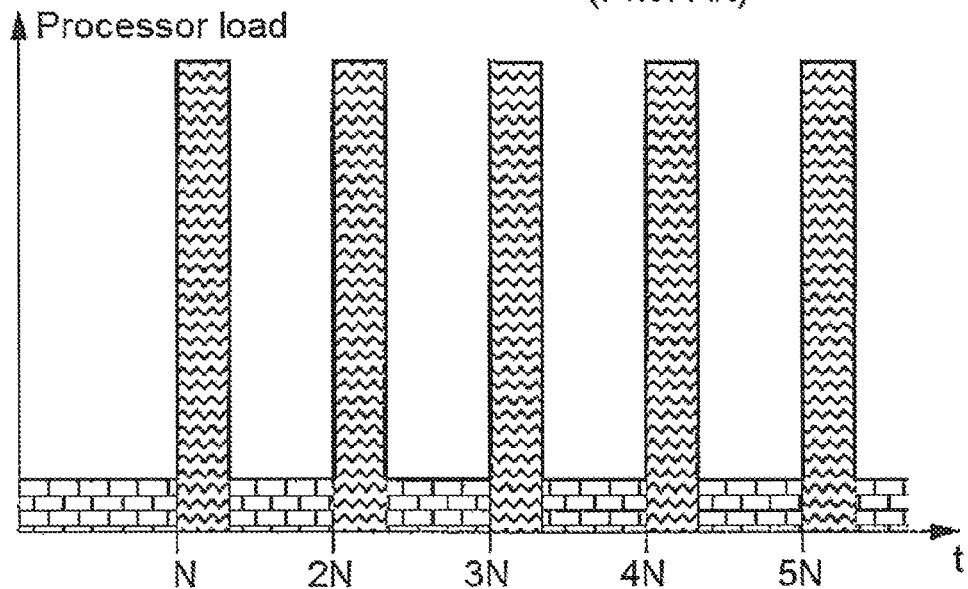
FIG. 1 a distribution of the computing load with conventional solutions for computing the convolution.
Figure 2:
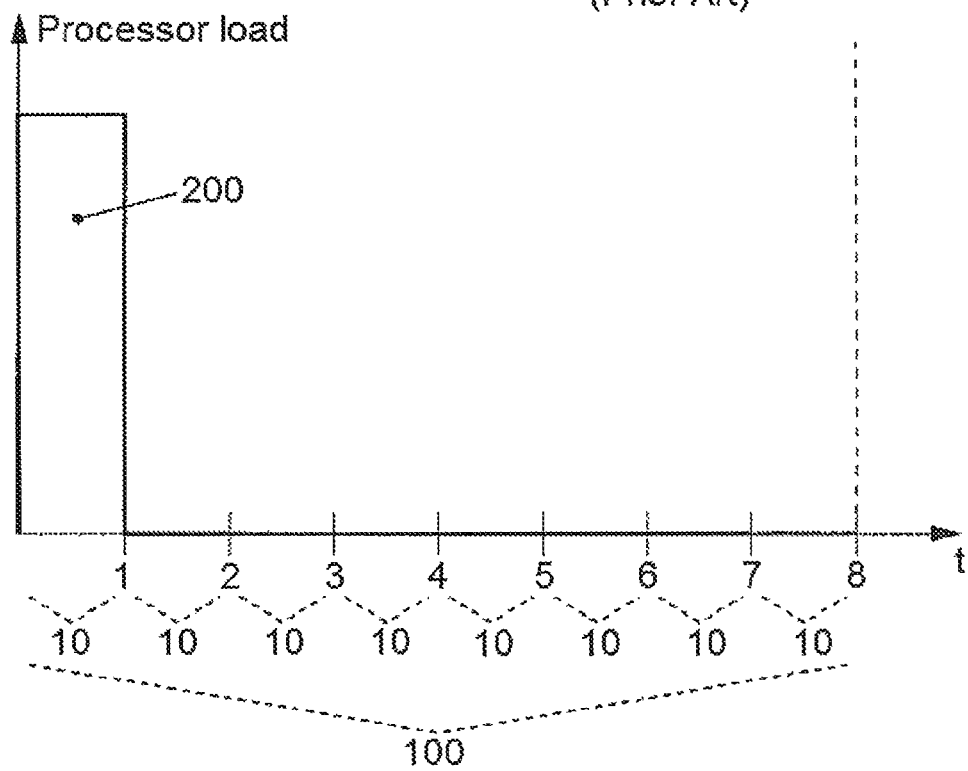
FIG. 2 a distribution of the computing load in a convolution according to the state-of-the-art.
Figure 3:
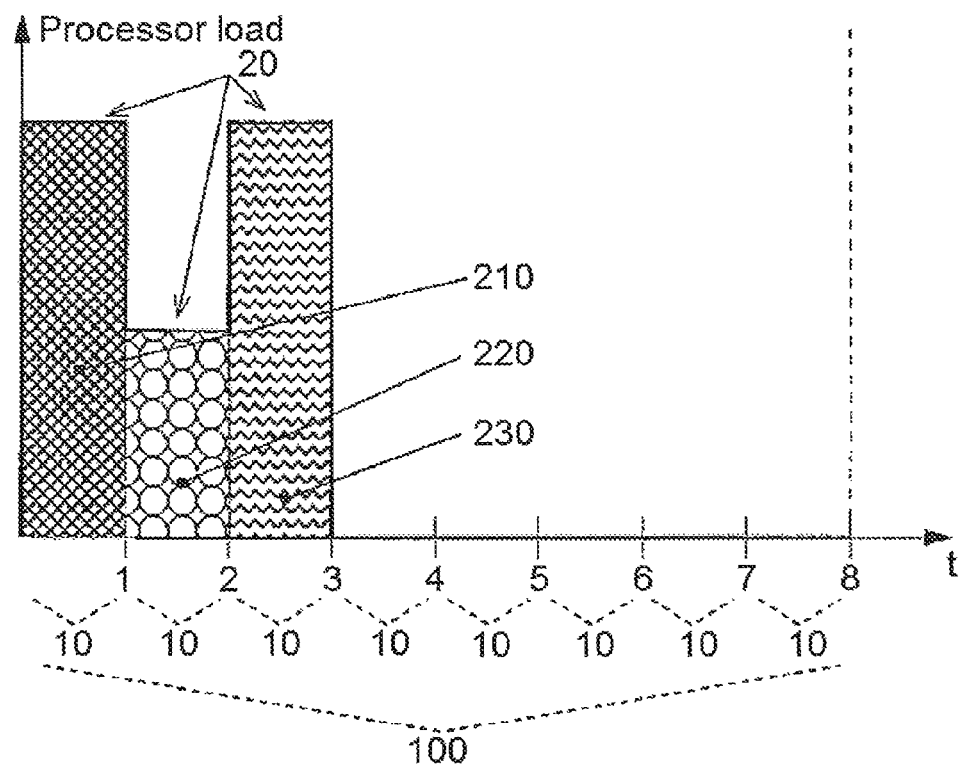
FIG. 3 a distribution of the computing load with segmentation into block operations.

FIG. 2 shows an exemplary implementation without the aforedescribed method, wherein the complete computation of the fast convolution 200 is performed in the time window of the first sampled value. The first step for improving the processor loading involves decomposition of the fast convolution into its block operations, i.e., fast Fourier transformation 210, block multiplication 220 and back-transformation 230. FIG. 3 shows an approach for decomposing the computing load into three computing steps 20 which are distributed over three time windows. As can be readily seen, an additional decomposition of the three computing steps may result in a more uniform utilization.

Figure 4:
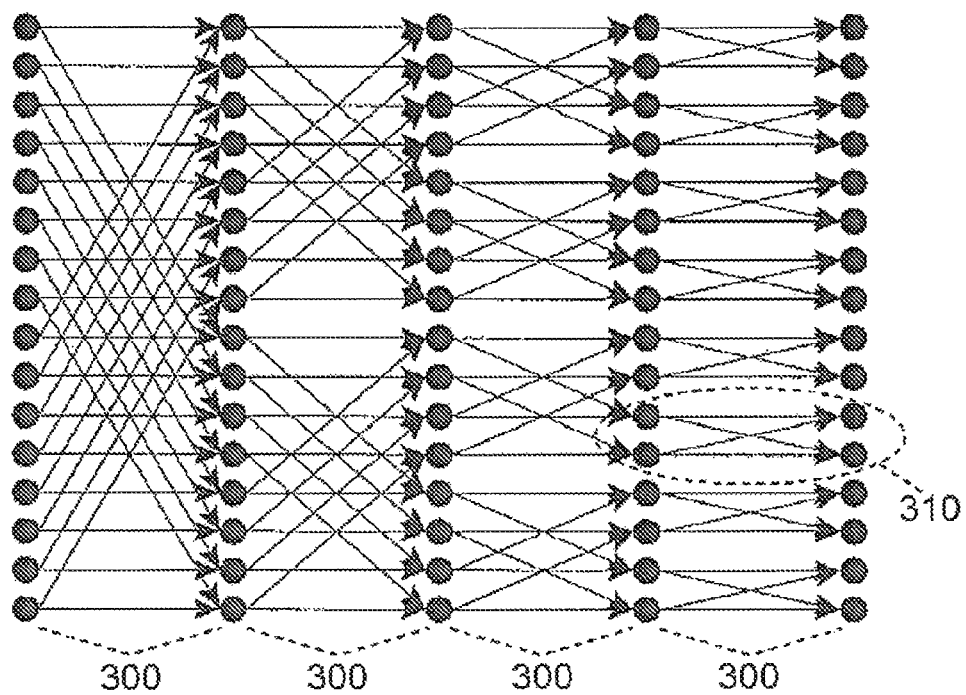
FIG. 4 a diagram of a computing pattern of an FFT.
Figure 5:
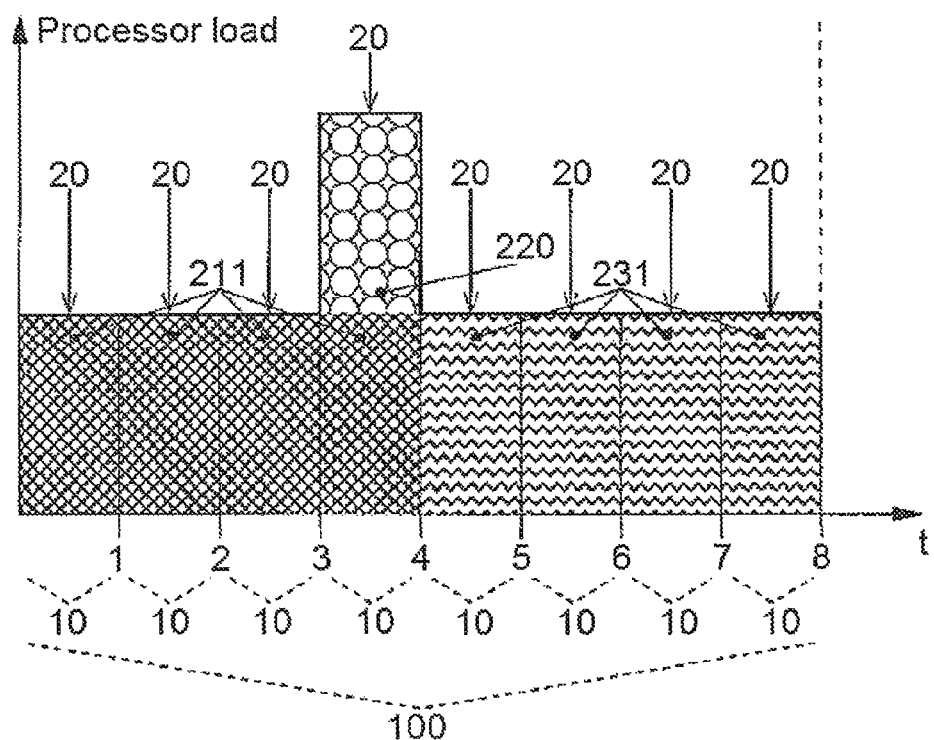
FIG. 5 a distribution of the computing load with segmentation of the FFT into butterfly planes.

A better load distribution can also be achieved by decomposing the FFT and the inverse FFT into smaller partial computing steps. FIG. 4 shows the computing pattern of the FFT, which consists of four sequential butterfly planes 300 with different interleaving. A butterfly plane 300 is here composed of eight butterfly operations 310. By computing the individual butterfly planes 300 for the FFT and the inverse FFT in individual computing steps 20 separately, a load distribution according to FIG. 5 can be attained (transformation 211, block multiplication 220 and back-transformation 231). In this implementation, the computing instruction is already divided into N computing steps 20. Although the utilization of the computing capacity is now significantly improved, the block multiplication still produces a small load peak. In addition, the number of the butterfly planes increases logarithmically with the block size, producing a smaller number of computing steps 20 as sampled values for greater block lengths, if the FFT and the inverse FFT, respectively, are executed for each butterfly plane in a single partial computing step.

Figure 6:
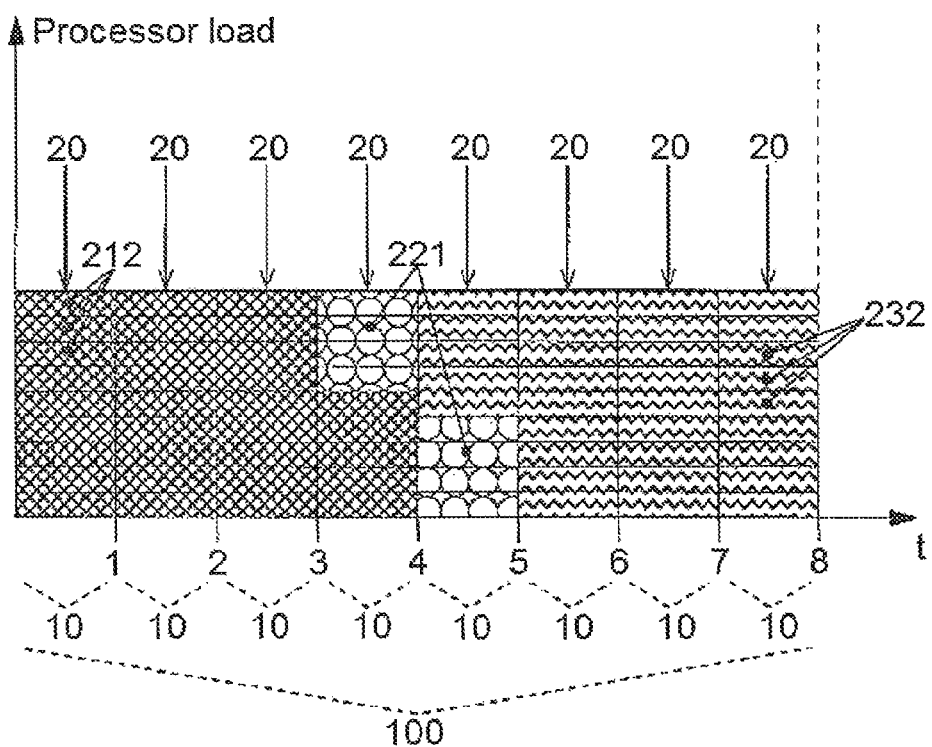
FIG. 6 a distribution of the computing load with segmentation of the FFT into butterfly operations, and segmentation of the block multiplication, and
  FIG. 7 a distribution of the computing load similar to FIG. 6, with an additional block multiplication.

The computation can be distributed significantly much more finely over time by segmenting the FFT and the inverse FFT into their individual butterfly operations 310. In this example, the FFT and the inverse FFT each have 32 butterfly operations 310. The block multiplication can also be segmented more finely. In this example, the block multiplication includes sixteen complex multiplications, which can be subdivided into eight partial computing steps which generate a similar computing load as a single butterfly operation 310. The fast convolution is therefore decomposed into 72 partial computing steps of equal size. FIG. 6 shows a possible combination of these partial computing steps into eight computing steps 20 of equal size (32 butterfly operations for the transformation 212, eight partial computing steps for the block multiplication 221, and 32 butterfly operations for the back-transformation 232).

For a fast convolution segmented in this way, the arrangement for the computation has eight states which are cycled through. One of the eight computing steps is associated with each state. A computing step 20 is therefore composed of a predetermined number of partial computing steps. In particular, the partial computing steps include also different computing operations in the computing steps 20 in the time window of the fourth and fifth sampled value: in this exemplary embodiment, computing operations for performing the transformation 212 and the block multiplication 221 and/or computing operations for performing the block multiplication 221 and the back-transformation 232.

The partial computing steps can theoretically be segmented into still small operations down to the elemental basic computing operations. The optimal segmentation can be determined both analytically (e.g., by counting the operations) as well as empirically (by time measurements on individual partial computations). More particularly, the segmentation pattern may also take into account optimization aspects by arranging the partial computing steps and/or computing steps 24 for a highest possible efficiency. For example, individual butterfly operations may then be combined into a computing step 20 so as to favor execution on a parallel computing unit.

It is known that several consecutive segment convolutions can each use a common FFT and a common inverse FFT, if the transformation results are intermediately stored. The full computing load consisting of FFT, block multiplication and inverse transformation then occurs only for the first segment convolution, whereas the subsequent segment convolutions are limited to a block multiplication. A dedicated segmentation pattern for the subsequent segment convolutions may then be defined, with the block multiplication decomposed in a similar manner. Alternatively, the block multiplication of the subsequent segment convolutions may be included in the distribution pattern of the first segment convolution. FIG. 7 shows a possible diagram of the segmentation pattern of the preceding example with an additional segment convolution (32 butterfly operations for the transformation 212, eight partial computing steps for the first block multiplication 221, eight partial computing steps for the second block multiplication 241, and 32 butterfly operations for the back-transformation 232).

The implementation of the invention is not limited to the exemplary embodiments described above. Instead, a number of modifications may be contemplated which take advantage of the method according to the invention, the arrangement according to the invention, the computer program according to the invention or the computer-readable storage medium according to the invention, even in fundamentally different embodiments.

LIST OF REFERENCES SYMBOLS

10 Time window
20 Computing step
100 Time during which a block is inputted and outputted
200 Computation of the fast convolution
210 Fast Fourier transformation
211 Butterfly plane of the transformation
212 Butterfly operation of the transformation
220 Block multiplication
221 Partial computing step of the block multiplication
230 Back-transformation 231 Butterfly plane of the back-transformation
232 Butterfly operation of the back-transformation
241 Partial computing step of an additional block multiplication
300 Butterfly plane
310 Butterfly operations

We claim:

1. A method for distributing processor load in a data processing system during execution of a set of computing instructions on a last received block while receiving input values of an incoming block, wherein the last received block and the incoming block, each, comprise a number N of time-sequentially input values, wherein a timing of the input values of the incoming block subdivides the time, during which input values of an incoming block are received, into N time windows, and the method comprises:
   receiving the N input values of the incoming block sequentially, and
   processing N computing steps sequentially on the N input values of the last received block wherein the N computing steps result from dividing the operations of the set of computing instructions into N computing steps of equal size, wherein each of the computing steps is processed in one of the time windows and therefore generates an approximately identical processor load in the data processing system;
   wherein for each of the N input values of the incoming block received, one of the N computing steps is processed such that a result of the set of computing instructions on the last received block is returned when the N-th input value of the incoming block arrives;
   wherein at least a portion of the computing steps comprises several sub-computing steps, the sub-computing steps comprising several basic calculation operations; and
   wherein the time-sequentially input values represent digitalized multi-media signals.

2. The method according to claim 1, wherein the computing steps are processed with the timing of the incoming input values.

3. The method according to claim 1, wherein states of the data processing system are defined and stored in a state memory, and that processing of the computing steps is controlled depending on the states.

4. The method according to claim 1, wherein the computing instructions comprise computing a convolution and/or that the operations comprise computing steps of a Fourier transformation, computing steps of an inverse Fourier transformation, block multiplications, butterfly operations, complex multiplications, basic computing operations and/or other mathematical operations.

5. The method of claim 1 wherein the method is implemented by a computer program downloaded from an electronic data network to the data processing system connected to the data network.

6. The method of claim 5 wherein the electronic data network is the internet.

7. The method of claim 1 wherein the multi-media signals are selected from the group consisting of audio signals, video signals, and combination thereof.

8. A system comprising:
   at least one processor and a memory coupled to the processor having instructions that when executed causes the processor to carry out the steps for distributing the load of the at least one processor during execution of a set of computing instructions on a last received block while receiving input values of an incoming block, wherein the last received block and the incoming block, each, comprise a number N of time-sequentially input values, wherein a timing of the input values of the incoming block subdivides the time, during which input values of an incoming block are received, into N time windows, and the steps comprises:
   receiving, by the at least one processor, the N input values of the incoming block sequentially, and
   processing, by the at least one processor, N computing steps sequentially on the N input values of the last received block wherein the N computing steps result from dividing the operations of the set of computing instructions into N computing steps of equal size, wherein each of the computing steps is processed in one of the time windows and therefore generates an approximately identical processor load in the data processing system;
   wherein for each of the N input values of the incoming block received one of the N computing steps is processed such that a result of the set of computing instructions on the last received block is returned when the N-th input value of the incoming block arrives;
   wherein at least a portion of the computing steps comprises several sub-computing steps, the sub-computing steps comprising several basic calculation operations; and
   wherein the time-sequentially input values represent digitalized multi-media signals.

9. A non-transitory computer-readable storage medium, on which a program is stored, which enables a data processing system, after the program is loaded into memory means of a data processing system, to execute a method for distributing processor load in the data processing system during execution of a set of computing instructions on a last received block while receiving input values of an incoming block, wherein the last received block and the incoming block, each, comprise a number N of time-sequentially input values, wherein a timing of the input values of the incoming block subdivides the time, during which input values of an incoming block are received, into N time windows, and the method comprises:
   receiving the N input values of the incoming block sequentially, and
   processing N computing steps sequentially on the N input values of the last received block wherein the N computing steps result from dividing the operations of the set of computing instructions into N computing steps of equal size, wherein each of the computing steps is processed in one of the time windows and therefore generates an approximately identical processor load in the data processing system;
   wherein for each of the N input values of the incoming block received one of the N computing steps is processed such that a result of the set of computing instructions on the last received block is returned when the N-th input value of the incoming block arrives;
   wherein at least a portion of the computing steps comprises several sub-computing steps, the sub-computing steps comprising several basic calculation operations; and
   wherein the time-sequentially input values represent digitalized multi-media signals.

* * * * *